United States Patent [19]

Thomas

[11] 4,246,638
[45] Jan. 20, 1981

[54] METHOD AND APPARATUS FOR CONTROLLING USAGE OF A PROGRAMMABLE COMPUTING MACHINE

[76] Inventor: William J. Thomas, 6146 Winterbrook Dr., San Jose, Calif. 95129

[21] Appl. No.: 942,422

[22] Filed: Sep. 14, 1978

[51] Int. Cl.³ .................. G06F 13/00; H04K 1/00
[52] U.S. Cl. .............................. 364/200; 371/72
[58] Field of Search ... 364/200 MS File, 900 MS File; 235/301; 178/22; 371/72

[56] References Cited

U.S. PATENT DOCUMENTS

| | | | |
|---|---|---|---|
| 3,609,697 | 9/1971 | Blevins et al. | 364/200 |
| 3,889,242 | 6/1975 | Malmer, Jr. | 364/200 |
| 3,962,539 | 6/1976 | Ehrsam et al. | 178/22 |
| 4,037,214 | 7/1977 | Birney et al. | 364/200 |
| 4,120,030 | 10/1978 | Johnstone | 364/200 |
| 4,168,396 | 9/1979 | Best | 178/22 |

Primary Examiner—Charles E. Atkinson
Attorney, Agent, or Firm—Phillips, Moore, Weissenberger, Lempio & Majestic

[57] ABSTRACT

A method for controlling usage of a programmable computing machine which operates in accordance with uncoded or published machine language operation codes including uniquely encoding the uncoded operation codes of instructions of a program to be used on the computing machine as a function of location of the instructions in memory and as a function of machine state, and adding to the machine a decoder that decodes only the uniquely encoded operation codes. Apparatus for controlling usage of a programmable computing machine which operates in response to uncoded or published machine language operation codes including memories which store machine user created programs and operating system programs, in which each program has instructions with uncoded and encoded operation codes, decoders to decode the encoded operation codes of the instructions of the user created program and the encoded operation codes of the instructions of the operating system program, and a circuit to execute the instructions of the user created program and the operating system program having the decoded and the uncoded operation codes.

23 Claims, 11 Drawing Figures

FIG_1A

```
SEC         POINTL
LDA         # $01
SBC         POINTL
STA         FEED I
BCS         POINTH
DEC         SHOW
JMP
```

FIG_1B

```
IE07    38    FA
IE08    A5    01
IE0A    E9    FA
IE0C    85    02
IE0E    B0    FB
IE10    C6    AC
IE12    4C    1D
```

FIG_1C

```
IE07    30    FA
IE08    87    01
IE0A    2C    FA
IE0C    E0    02
IE0E    A5    FB
IE10    4A    AC
IE12    42    1D
```

FIG_2

```
0 = 0000        8 = 1000
1 = 0001        9 = 1001
2 = 0010        A = 1010
3 = 0011        B = 1011
4 = 0100        C = 1100
5 = 0101        D = 1101
6 = 0110        E = 1110
7 = 0111        F = 1111
```

FIG_5

| | $c_3$ | | | | $c_2$ | $c_1$ | $c_0$ |
|---|---|---|---|---|---|---|---|
| 118 | — | — | — | — | 0 | — | 0 |
| 116 | — | — | — | — | — | 0 | 0 |
| 132 | 0 | — | 0 | — | 0 | — | — |
| 134 | 0 | 0 | — | — | 0 | 0 | — |
| 46 | 0 | 0 | 0 | 0 | — | — | — |

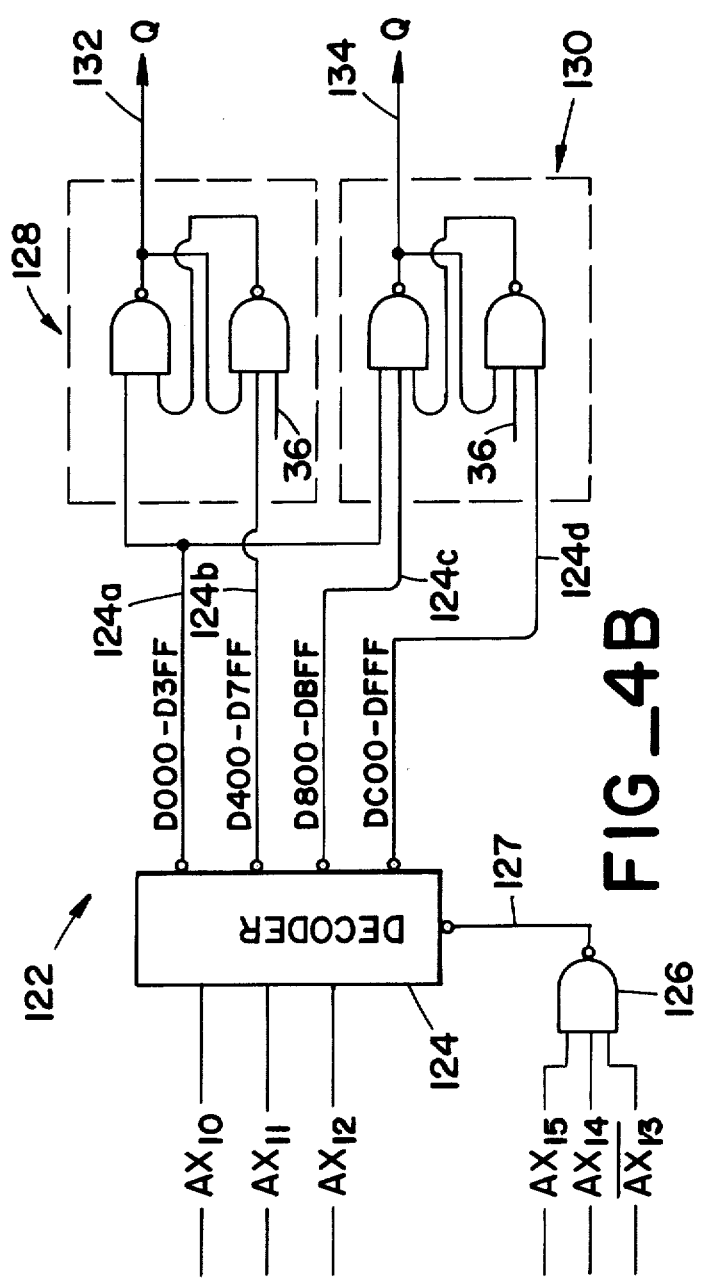
FIG_4B
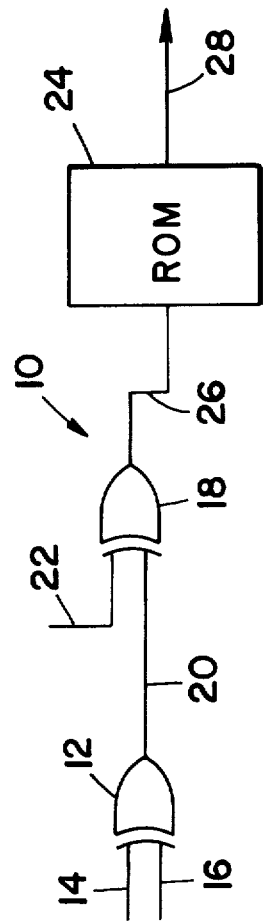
FIG_3

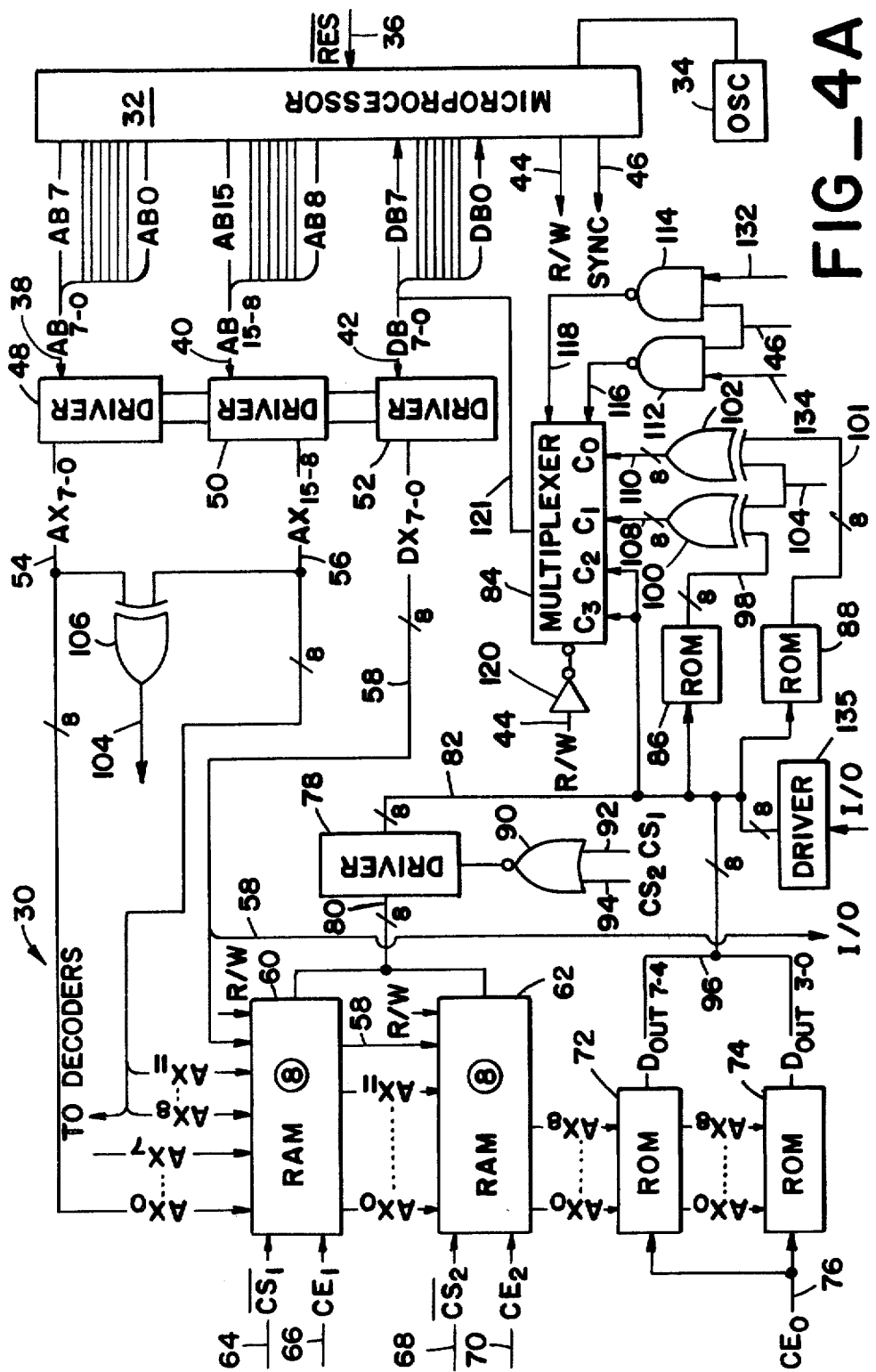
FIG_4A

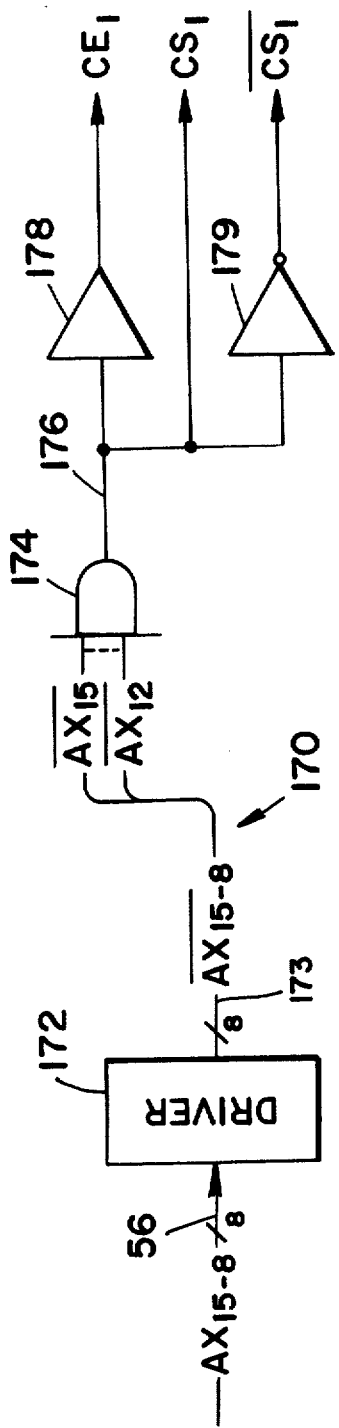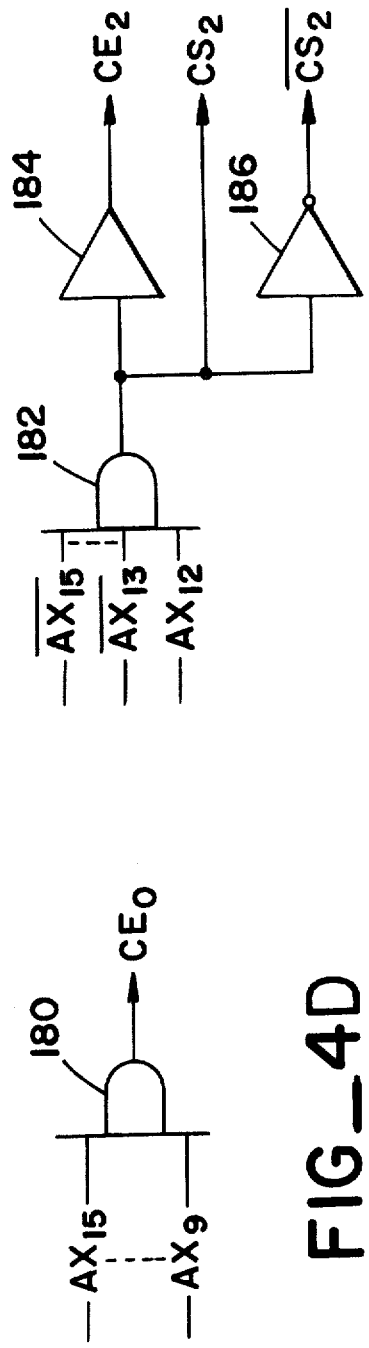

METHOD AND APPARATUS FOR CONTROLLING USAGE OF A PROGRAMMABLE COMPUTING MACHINE

BACKGROUND OF THE INVENTION

This invention relates to a technique for controlling usage of a programmable computing machine and, more particularly, to an apparatus and method for preventing the unauthorized copying or use of software to run the machine and to prevent the unauthorized modification of the operating system of the machine.

In todays world, information has commercial value and therefore has become a valuable asset. As a result, computers and the entire computer industry have grown substantially to process this information or data and put it to work in many ways. While advancement in computer hardware technology is continuing, it is projected that even greater advancement will be made in the computer software industry in view of the large investments that are being made in the software area.

Along with the growth of the computer industry has come significant problems relating to the protection of software and computer security and privacy. More particularly, in the field of software protection, software developers can not adequately protect their large investments against the unauthorized copying of the software. For example, the hardware manufacturer of microprocessors will supply identical machines to a plurality of different users. Typically, the architecture of the microprocessor is such as to enable the users themselves to program the machine via conventional assembly language or higher level language, e.g., Cobol, such as is described in a series of three articles entitled Unraveling the Mystery in User Microprogramming, by Robert Frankenberg, appearing in Technology Profile, June, 1977. A problem, though, is that the program written by one user for use on this user's machine can be copied and run on the machine of another user without authorization of the one user.

One approach to protecting the unauthorized copying a software is for the microprocessor user to write a program having instructions which utilize the published operation codes of the instruction set of the microprocessor. Then, the program writer can take a certain number of these instructions, e.g., 20, and reduce them to one instruction in microcode. The user can then assign a new operation code to this one instruction and have the microprocessor manufacturer modify the machine by adding this new operation code to the instruction set without publishing it to anyone else. Consequently, knowledge of the function of the new operation code would have to be obtained before the function could be rewritten with the published instruction set of another machine and the program with the new operation code run on such other machine.

A disadvantage with this approach is that the reduction of the 20 instructions to one instruction in microcode complicates the programming. Also, a control store of the microprocessor, which is a memory where microprograms are stored and is used by a control processor of the microprocessor as its memory, would have to be modified to provide for lines of microcoding in addition to those required for the standard routines of the microprogram.

In connection with the field of computer security and privacy, large computing machines are provided with operating systems developed by the manufacturer and which also include instructions having operation codes. For example, the operating system may be used to access information stored within a computer such as deposit records of a bank. It is possible for someone to enter the room in which the computer is located, and manipulate the control panel of the computer to modify the operating system without authorization to alter the bank deposit records.

Various solutions to this problem of computer security and privacy have been proposed including identity verification techniques that control who gains access to the information within the computer. These techniques include fingerprint identification, voice identification and the use of computer readable ID cards. However, these solutions are recognized as not being entirely satisfactory since the art recommends that management controls and procedures should also be implemented for the operation of the computer. These controls and procedures range from the selection of a secure location for the computer to well designed rules spelling out who may use it and how it may be used. An extensive discussion of the problem of computer security and privacy is set forth in a book entitled Modern Methods for Computer Security and Privacy, by Hoffman, Prentice-Hall, Inc., N.J., 1977.

SUMMARY OF THE INVENTION

In one aspect, the invention includes a method of controlling usage of a programmable computing machine which operates in accordance with published operation codes. The method includes encoding the published operation codes of the instructions of a program to be used on the computing machine, and adding to the computing machine a decoder to decode the encoded operation codes to perform the object of the program.

In another aspect, the invention constitutes apparatus for controlling usage of a programmable computing machine which operates in accordance with published operation codes. The apparatus includes means for storing a program having instructions with encoded operation codes, means for decoding the encoded operation codes of the instructions, and means for executing the instructions of the program in accordance with the decoded operation codes.

BRIEF DESCRIPTION OF THE DRAWINGS

FIG. 1A illustrates a plurality of instructions of a computer program written in symbolic code.

FIG. 1B illustrates the instructions of FIG. 1A assembled in machine language that the computer is capable of executing.

FIG. 1C illustrates the instructions of FIG. 1B which are encoded in accordance with the present invention.

FIG. 2 is a table showing in hexadecimal notation 16 possibilities 0–9 and A–F.

FIG. 3 illustrates a logic circuit used to encode the instructions of FIG. 1B into the instructions of FIG. 1C.

FIGS. 4A–4E illustrate schematically a computing machine of the present invention.

FIG. 5 is a truth table useful in explaining the operation of the invention.

DETAILED DESCRIPTION OF THE INVENTION

As one example, the invention will be described in relation to a particular computing machine, that being a microprocessor manufactured by MOS Technology, Inc., Norristown, Pa. under Model No. MCS6502, now Commandor Business Machines of Palo Alto, Calif. It will become apparent that the principles of this invention can be applied to other types of computing machines including other microprocessors and larger computing machines. The invention also will be described using hexadecimal notation since many digital computers, including the one in the present example, use a numeration system whose radix is 16.

As is well known, computing machines utilize operation codes which represent the specific operations to be performed or that may be performed by the machine. The operation codes typically are published by the machine manufacturer as an instruction set giving the operation codes in symbolic code and machine language. For example, the instruction set of the MCS6502 microprocessor has 55 operation codes such as LDA (symbolic) meaning load accumulator with memory and JMP (symbolic) meaning jump to new location.

In FIG. 1A, there is shown part of a program written in symbolic code. There is shown seven separate instructions from SEC through JMP. Thus, for example, the instruction LDA PφINTL means load the accumulator from memory location PφINTL. In machine language, as shown in FIG. 1B, this instruction is given as A5 FA, in which A5 is published machine language operation code and corresponds to LDA, and FA corresponds to PφINTL. Similarly, the instruction DEC PφINTH in FIG. 1A means decrement the memory by 1 from memory location PφINTH. The corresponding machine language instruction shown in FIG. 1B is C6, which is published machine language, and FB. As will be seen, therefore, for the seven instructions of the part of the program shown in FIG. 1A, there are seven corresponding instructions in machine language shown in FIG. 1B.

The instructions shown in FIG. 1B are normally stored in a memory and are fetched by the microprocessor from the memory when the program calls for their execution. As shown in FIG. 1B, each instruction is stored in a memory location or space. That is, for example, the instruction 38 is stored at memory location 1E07, the instruction A5 FA at memory location 1E08, the instruction E9 01 at memory location 1E0A, and so on. Actually, in accordance with the invention, the operation codes of these instructions are not stored at these memory locations in the published machine language, but rather these operation codes are so stored in an encoded format as may be seen by comparing FIGS. 1B and 1C. Thus, the published machine language operation code 38 at memory location 1E07 is stored as encoded machine language operation code 30 and the published machine language operation code A5 is stored in memory location 1E08 as encoded machine language operation code 87.

Before discussing the manner of encoding the operation codes, it should be noted, as is well known, that the instructions are stored in the memory as a sequence of bits. With reference to FIG. 1B and FIG. 2, the instruction at location 1E07, i.e., the operation code 38, comprises bits 0011 for digit 3 and bits 1000 for digit 8. Similarly, the instruction at memory location 1E08 in bit format would be 1010 (for A), 0101 (for 5) 1111 (for F) and 1010 (for A).

FIG. 3 illustrates a circuit 10 used to assemble or encode the operation codes of FIG. 1B into the operation codes of FIG. 1C. An exclusive-OR gate 12 has two inputs 14 and 16, respectively, receiving the high byte and the low byte of the memory address at which the corresponding instruction is to be stored. An exclusive-OR gate 18 has one input 20 which is the output of the gate 12 and another input 22 receiving the byte of the uncoded machine language operation code of FIG. 1B. A read only memory or ROM 24 is coupled to the output of the gate 18 via a line 26 and provides an output on a line 28 corresponding to the encoded operation codes of FIG. 1C. The ROM 24 has a table of stored information or predetermined data constituting a plurality of encoded operation codes.

The encoding of the machine language operation codes of FIG. 1B occurs in the following manner. The high byte and low byte of the address are exclusive-ORed by gate 12. Then, the result or output of gate 12 is exclusive-ORed with the operation code on line 22 by the gate 18. The output on line 26 is then an address of a location in the ROM 24 which responds by outputting its contents at the addressed location on line 28. The manner in which the ROM 24 outputs the operation codes on line 28 is similar to a commonly used, table-look-up operation.

Two specific examples will now be given showing the encoding or conversion of the operation codes 38 and A5 of FIG. 1B to the encoded operation codes 30 and 87, respectively, of FIG. 1C. The instruction having the operation code 38 is to be stored in encoded form at memory location 1E07 while the next instruction having the operation code A5 is to be stored in encoded form at memory location 1E08.

In relation to the first instruction shown in FIG. 1B, the address portion 1E is provided on line 14 and exclusive-ORed with the address portion 07 on line 16 by the gate 12. In hexadecimal notation, this function will appear as follows:

| 1E | 0001 | 1110 |
|----|------|------|
| ⊕  |      |      |
| 07 | 0000 | 0111 |
| 19 | 0001 | 1001 |

The output of the gate 12 is, therefore, a digital word 0001 1001 which corresponds to the number 19. This output of gate 12 on line 20 is then exclusive-ORed with the code 38 on line 22 as follows:

| 19 | 0001 | 1001 |
|----|------|------|
| ⊕  |      |      |
| 38 | 0011 | 1000 |
| 21 | 0010 | 0001 |

The output of gate 18 is, therefore, a digital word 0010 0001 corresponding to address 21 for the ROM 24. The contents of the ROM 24 at this address 21 will be the encoded operation code 30 which in digital form is 0011 0000.

For the next instruction, the address portion 1E on line 14 is exclusive-ORed with the address portion 08 on line 16 as follows:

| 1E | 0001 | 1110 |
|----|------|------|
| ⊕  |      |      |
| 08 | 0000 | 1000 |
| 16 | 0001 | 0110 |

The result of this operation is therefore a number 16. This output of the gate 12 on line 20 is then exclusive-ORed with the code A5 on line 22, as follows:

| 16 | 0001 | 0110 |
|---|---|---|
| ⊕ | | |
| A5 | 1010 | 0101 |
| B3 | 1011 | 0011 |

The result on line 26 is, therefore, B3 or, digitally, 1011 0011 which is the next address for the ROM 24. The contents of the ROM 24 at address B3 will therefore be 87 or 1000 0111 which is then provided on line 28 as the encoded operation code.

With the above two examples, it will thus be seen how the instructions of FIG. 1B having the uncoded operation codes are encoded or converted to the instructions of FIG. 1C. The table of ROM 24 is such that for each different address on line 26 the ROM contents or encoded operation codes will be different.

FIG. 4A illustrates part of a computing machine or system 30 that is microprogrammed with the instructions shown in FIG. 1C. The system 30 includes a microprocessor 32 which is the model MCS6502 previously mentioned. An oscillator 34 constitutes a master clock for the system 30 and a reset input $\overline{RES}$ on a line 36 is used to reset or start the microprocessor 32 from a power down condition. The microprocessor 32 supplies information on a number of busses including address busses AB0–AB7 and AB8–AB15 supplying, respectively, low and high addresses, and data busses DB0–DB7. As shown in FIG. 4A, the lines 38 and 40 constitute the address busses $AB_{7-0}$ and $AB_{15-8}$, respectively, while the line 42 constitutes the data bus $DB_{7-0}$. The microprocessor 32 also provides a read/write signal on a line 44 and a synchronization signal on a line 46. The signal on line 44 is high when reading data and low when writing data. The synchronization signal on line 46 is provided to identify when the microprocessor 32 is doing an operation code fetch in performing an instruction. This synchronization signal will go high during the operation code fetch.

The address information on lines 38 and 40 is amplified by, respectively, drivers 48 and 50 and supplied as low byte addresses on busses $AX_{7-0}$ or line 54 and high byte addresses on busses $AX_{15-8}$ or line 56. The data on line 42, for a write operation, is amplified by a driver 52 and supplied on busses $DX_{7-0}$ or line 58.

The instructions shown in FIG. 1C are stored in random access memories or RAMs 60 and 62. Actually, each memory 60 and 62 constitutes eight memories having a storage capacity of 8×1. The RAMs 60 and 62 are addressed by the bit information on address busses AX0–AX11 of lines 54 and 56. Data is written into the RAMs 60 and 62 over the line 58, with the signal on line 44 being low. A pair of lines 64 and 66, carrying, respectively, a chip-select signal $\overline{CS_1}$ and chip-enable signal $CE_1$ are used to output the instructions in the RAM 60 at the addressed location, with the signal on line 44 being high. Another pair of lines 68 and 70 carry, respectively, a chip select signal $\overline{CS_2}$ and a chip enable signal $CE_2$ to output the instructions and data in the memory 62 at the addressed location, also with the signal on line 44 being high.

FIG. 4A also illustrates a pair of read only memories or ROMs 72 and 74 which are addressed with the information on address busses AX0–AX8. The memories 72 and 74 are enabled at the addressed locations with a chip enable signal $CE_0$ on a line 76. The memories 72 and 74 store at least part of the operating system or software for operating the system 30. For example, the memories 72 and 74 can store the executive routines of the operating system, which routines perform the housekeeping details for the system 30 such as checking for equipment malfunctions or checking on the priority assignment of a number of programs in addition to the one shown in FIG. 1C that are stored in the memories 60, 62 and are to be run by the microprocessor 32.

The executive routines constitute a number of instructions that are stored at various locations in the memories 72 and 74 and in which a part of these instructions includes the operation codes for the microprocessor 32. In a similar manner as described above, the instructions stored in the memories 72 and 74 have their operation codes encoded in dependence on their stored location and the particular published or uncoded operation code of the instruction set of microprocessor 32. The instructions stored in the memories 72 and 74 are encoded with a circuit which is the same as circuit 10 of FIG. 3, except that a ROM similar to the ROM 24 would have a table different than the table of ROM 24 for purposes of encoding the operation codes of these executive routine instructions different than the encoding of the operation codes of the instructions stored in the RAMs 60 and 62. The reasons for this difference of encoding will be discussed below.

A driver 78 receives the output instructions from the RAMs 60, 62 on a line 80 and amplifies the signals on this line 80. The amplified instructions are then fed over a line 82 to inputs $C_2$ and $C_3$ of a multiplexer 84, to a read only memory or ROM 86 and to another read only memory or ROM 88. The driver 78 is enabled via the output of a NOR gate 90 having two input lines 92 and 94 carrying, respectivley, a chip select signal $CS_1$ and $CS_2$. The output instructions on a line 96 from the ROMs 72 and 74 are also fed to the inputs $C_2$ and $C_3$ of multiplexer 84, the ROM 86 and the ROM 88.

The ROMs 86 and 88 store tables of information or predetermined data for decoding the encoded operation codes stored in the memories 60, 62 and 72, 74, respectively. The ROM 86 is addressed with the information on the line 82 or 96 and responds by providing the contents of the addressed location on a line 98 as one input to an exclusive-OR gate 100. The ROM 88 is addressed with the information on line 82 or 96 and responds by providing the contents of the addressed location on a line 101 as one input to another exclusive-OR gate 102. The other input to each of the gates 100 and 102 is a signal on a line 104. This latter signal on line 104 is the result of an exclusive-OR operation provided by a gate 106 whose two inputs are the signals on lines 54 and 56, respectively. The outputs of the gates 100 and 102 are fed to the respective inputs $C_1$ and $C_0$ of multiplexer 84 on lines 108 and 110.

A pair of NAND gates 112 and 114 provide output signals on, respectively, lines 116 and 118 that control the multiplexer 84 to select inputs $C_0$, $C_1$, $C_2$ or $C_3$. The multiplexer 84 is enabled when the read/write signal on line 44 is high via an inverter 120. The output of the multiplexer on a line 121 is returned to the microprocessor 32 via the line 42 for execution of an instruction. This line 42 or data busses $DB_{7-0}$ will be in a high impedance state when the read/write signal on line 44 is high.

Also shown in FIG. 4A is a driver 135 which supplies information from an I/O register (not shown) used to transfer instructions and data into the computing system 30 as shown.

FIG. 4B illustrates a circuit 122 for controlling the NAND gates 112 and 114. A decoder 124 is coupled to the address busses AX10-AX12 to decode the address information on these lines. A NAND gate 126 is coupled to the address busses $\overline{AX13}$, $AX_{14-15}$ to decode the information on these lines and enable the decoder 124 via a line 127.

A pair of flip-flops 128 and 130 have inputs coupled to outputs on lines 124a, 124b, 124c and 124d of the decoder 124, as illustrated. The outputs on lines 124a-124d are used to set and reset the flip-flops 128, 130 as will be further described. The flip-flop 128 has its output Q on a line 132 coupled as one input to the NAND gate 114. This flip-flop is reset by the reset signal $\overline{RES}$ on the line 36. The flip-flop 130 has an output Q coupled over a line 134 as one input to the NAND gate 112. The reset signal $\overline{RES}$ also resets this flip-flop 130 over the line 36. As shown in FIG. 4A, the other input at each of the NAND gates 112 and 114 is the synchronization signal on the line 46. FIG. 5 shows the truth table for selecting the inputs $C_0$, $C_1$, $C_2$ or $C_3$ to the multiplexer 84 from the outputs of the gates 112 and 114 on lines 116 and 118.

FIG. 4C illustrates a logic circuit 170 for obtaining the signals $CE_1$, $CS_1$ and $\overline{CS_1}$. The address busses $AX_{15-8}$ of the line 56 are coupled to a driver 172 which amplifies and inverts the input signals to provide outputs on busses $\overline{AX_{15-8}}$. The busses $\overline{AX12}$-$\overline{AX15}$ are coupled as inputs to an AND gate 174. The output of the AND gate 174 on a line 176 is coupled via an amplifier 178 to provide the signal $CE_1$, and via an inverter 179 to provide the signal $\overline{CS_1}$, with this output directly providing the signal $CS_1$.

As shown in FIG. 4D, the address busses AX9-AX15 are coupled directly to an AND gate 180 to provide the signal $CE_0$. As illustrated in FIG. 4E, the address busses AX12 and $\overline{AX_{13-15}}$ are connected as the inputs to an AND gate 182. The output of this AND gate 182 is fed to an amplifier 184 and an inverter 186 to provide the signals, respectively, $CE_2$ and $\overline{CS_2}$. The output of the AND gate 182 directly supplies the signal $CS_2$.

With reference to FIG. 4B, the decoder 124 and NAND gate 126 are configured to decode address space (busses $AX_{10-12}$, AX13 and $AX_{14-15}$) where neither RAM, ROM or I/O registers reside. Therefore, a program counter (not shown) in the microprocessor 32 will never, if the program is running correctly, generate an address which will cause decoder 124 to become active. Instead, an address generated from an operand of an instruction, i.e., an address that an instruction generates rather than an address which the program counter generates, can cause decoder 124 to become active. Such an instruction is not used in the normal manner; it will neither write to RAM or an I/O register nor read from RAM, ROM or an I/O register. Instead, the instruction operand via decoder 124 is used to set or reset flip-flop 128 or 130.

More particularly, and as one example, in the computing machine 30 the following table shows the instruction operands that are predetermined to perform the setting and resetting of the flip-flops 128, 130:

| Operand | FF 128 | FF130 |
|---|---|---|
| D800-DBFF | — | Set |
| DC00-DFFF | — | Reset |
| D400-D7FF | Reset | — |
| D000-D3FF | Set | Set |

FIG. 4B illustrates the circuit 122 implementing the above table.

In operation, assume that a program is being run on microprocessor 32 and that the encoded instructions shown in FIG. 1C are to be fetched and executed. As will become apparent, flip-flop 130 should therefore be set. Consequently, in front of the instruction at location 1E07 of RAM 62, there will be stored the following instructions:

| 1E04 | AD |
|---|---|
| 1E05 | 00 |
| 1E06 | D8 |

Instruction AD is an uncoded machine language operation code of the published instruction set of the MCS6501 microprocessor corresponding to symbolic code LDA. Instructions 00 and D8 are the operands used to set the flip-flop 130.

As the program is running, the program counter in microprocessor 32 will be incremented to provide an address on lines 38 and 40 corresponding to space 1E04. Consequently, the RAM 62 will be addressed at this location 1E04, selected by the signal $\overline{CS_2}$ on line 68 and enabled by the signal $CE_2$ on line 70, thereby to output the uncoded operation code AD. This operation code AD is then coupled through driver 78 and over line 82 to multiplexer 84. At this time, the microprocessor 32 is reading so that the read/write signal on line 44 is high, this signal then being inverted by inverter 120 to enable multiplexer 84. Simultaneously, since the microprocessor 32 is doing an operation code fetch, the synchronization signal on the line 46 is high, thereby providing a logic 1 signal as one input to gates 112 and 114.

At this time also, and with reference to FIG. 4B, since the decoder 124 is not decoding any of the operands of the above table, flip-flops 128 and 130 will be reset, i.e., lines 132 and 134 are logic 0. This occurred at power on or restart when the signal $\overline{RES}$ went momentarily low. The other inputs to gates 112 and 114 on lines 132 and 134 will therefore be logic 0. Consequently, the lines 116 and 118 will have logic 1 signals so that in accordance with the truth table of FIG. 5, input $C_3$ of multiplexer 84 is selected. The operation code AD is thus fed over lines 121 and 42 to the microprocessor 32.

Next, the program counter will be incremented to provide an address over lines 38 and 40 corresponding to location 1E05 of RAM 62. As a result, RAM 62 will be selected and enabled to output the least significant portion 00 of the instruction operand through driver 78 and over line 82 to multiplexer 84. At this time, the synchronization signal on line 46 is low since an operation code is not being fetched. Hence, a logic 0 is supplied at line 46 to both gates 112 and 114, whereby logic 1 is provided on lines 116 and 118. Consequently, input $C_3$ of multiplexer 84 again will be selected and the operand portion 00 fed to the microprocessor 32 over lines 121 and 42.

Next, again the program counter will advance to generate an address corresponding to location 1E06. The RAM 62 will thereby output the most significant portion D8 of the instruction operand through driver 78 and over line 82 to the multiplexer 84, ultimately to microprocessor 32 via input $C_3$.

Next, the microprocessor 32 places the operand address D800 over lines 38 and 40 to the address busses AX10-AX15. For a more detailed description of how this can be done, reference may be had to the MCS6500 Microcomputer Family Hardware Manual, Page A-3, section A.2.3. by MOS Technology, Inc., August 1975. With reference to FIG. 4B, since busses AX15, AX14, and $\overline{AX13}$ are connected to gate 126 and will carry logic 1's, a logic 0 will be provided on line 127 from gate 126 to enable decoder 124. The enabled decoder 124 will then decode its inputs on busses AX10-AX12 to provide an active low or logic 0 on line 124c coupled to flip-flop 130. Therefore, this active low will set the flip-flop 130 to provide a logic 1 on line 134. At this time also, the flip-flop 128 will remain reset to provide a logic 0 on line 132.

Next, the program counter in the microprocessor 32 will be incremented to provide an address over lines 38 and 40 corresponding to location 1E07. Consequently, the RAM 62 will be addressed at this location 1E07 and selected and enabled by the signals on lines 68 and 70 to output the encoded operation code 30 shown in FIG. 1C. The code 30 which, as noted above, is 0011 0000 in hexadecimal notation, is then coupled through the driver 78 and over line 82 to the multiplexer 84, ROM 86 and ROM 88. At this time, the microprocessor 32 is reading so that a high signal is provided on line 44, which signal is inverted by the inverter 120 to enable the multiplexer 84. Simultaneously, since the microprocessor 32 is doing an operation code fetch, the synchronization signal on the line 46 is high. Therefore, since at this time flip-flop 130 is set and flip-flop 128 reset, and since the signal on line 46 is high, the outputs of gates 112 and 114 will be, respectively, 0 and 1. Consequently, with reference to the truth table shown in FIG. 5, the multiplexer 84 will select the input $C_1$ on line 108 from the exclusive-OR gate 100.

The ROM 86 has a table which is the inverse of the table of the ROM 24 for decoding the encoded operation codes. That is, the contents of the ROM 86 at a given address on line 82 from driver 78 for an encoded instruction will be the corresponding address on line 26 for ROM 24. Since the encoded operation code is 30, the output of the ROM 86 will be the number 21, i.e., data, which in hexadecimal notation is 0010 0001 and corresponds to the above-mentioned address for ROM 24.

The number or signal 21 is then fed as one input to gate 100. The other input to the gate 100 is the output from the exclusive-OR gate 106 on line 104. The inputs of the gate 106 are the low and high bytes on the address busses of lines 54 and 56 which at this time correspond to 1E07. This exclusive-OR operation is, therefore, as follows:

| 1E | 0001 | 1110 |
|---|---|---|
| ⊕ | | |
| 07 | 0000 | 0111 |
| 19 | 0001 | 1001 |

Thus, the signal on line 104 is 0001 1001 corresponding to the number 19. The exclusive-OR function of the gate 100 then proceeds as follows:

| 19 | 0001 | 1001 |
|---|---|---|
| ⊕ | | |
| 21 | 0010 | 0001 |
| 38 | 0011 | 1000 |

Consequently, the output of the gate 100 is the signal 0011 1000 corresponding to the decoded operation code 38. This signal is then fed via the multiplexer 84 over the lines 121 and 42 to the microprocessor 32 to complete the fetching of the decoded operation code of the particular instruction. Thereafter, the microprocessor 32 interprets this decoded operation code to perform the particular first instruction shown in FIG. 1C.

After the first instruction has been executed, the program counter of the microprocessor 32 will be incremented to fetch the next instruction shown in FIG. 1C at the address location 1E08. In a similar manner as described above, the encoded operation code of this instruction will be fetched from the RAM 62 and fed through the driver 78 to the multiplexer 84, the ROM 86 and the ROM 88. Also in a similar manner as described above, the input $C_1$ of the multiplexer 84 will be selected. The encoded operation code 87 will be decoded by the ROM 86, gate 100 and gate 106 to the decoded operation code A5. The microprocessor 32 will then receive the code A5 over the lines 121 and 42 to execute the instruction defined by this code. Also in a similar manner, the program counter in the microprocessor 32 will be incremented after each byte of an instruction is fetched. Thus, it can now be seen that each encoded operation code at the locations in the RAM 62 shown in FIG. 1C will be decoded for processing by the microprocessor 32.

Assume now that the executive routines of the operating system stored in the ROMS 72 and 74 are to be executed. Assume also that, as with the manner described above of setting and resetting flip-flops 128, 130, there is previously stored in ROMs 72, 74, an instruction with an operand in the range D000 to D3FF. Such an instruction is stored in front of the encoded sequence instructions of the executive routine. Consequently, in a similar manner as described above, after the most significant portion of one operand in this range is fetched, the microprocessor 32 will provide an address to be decoded by decoder 124. As may therefore be seen from the above table and FIG. 4B, an active low will be provided on line 124a to set flip-flops 128 and 130.

Then, the program counter in the microprocessor 32 will be incremented to generate an address on the busses 38 and 40 for access to the following instruction of the executive routine. Particularly, the ROMS 72 and 74 will be enabled by the signal $CE_0$ at the address provided on the address busses $AX_0$-$AX_8$ to provide the encoded operation code of such following instruction on the line 96. This code is fed to the multiplexer 84, the ROM 86 and the ROM 88. At this time, the inputs on lines 46, 132 and 134 will be logic 1's due to the fetching of an operation code and setting of flip-flops 128, 130. In accordance with the truth table of FIG. 5, the input $C_0$ of the multiplexer 84 will be selected.

Also, the ROM 88 will decode the encoded operation code on the line 96 in accordance with its table. As with ROM 86, the table of ROM 88 is the inverse of the table of the ROM (not shown) used to encode the operation codes of the executive routine instructions. The output or data on line 101 of the ROM 88 will then be exclusive-ORed with the output of the gate 106 on the line 104, whereby the decoded operation code will be fed through the multiplexer 84 to the microprocessor 32. The microprocessor 32 will thereby execute the instruction in accordance with the decoded operation code. For example, this decoded code of the executive routine may be the code A5 which is the instruction for loading an accumulator.

In the examples given above, it was assumed that the microprocessor 32 was to execute an instruction which had an encoded operation code, e.g., either an instruction stored in the RAM 62 or in the ROMs 72, 74. As already implied, during the running of a program, it may be that instructions having uncoded operation codes are stored in the RAMs 60, 62 or ROMs 72, 74. Again, in a similar manner already described, an instruction stored and executed with an operand in the range DC00-DFFF will reset flip-flop 130 via an active low on line 124d. Also, an operand in the range of D400-D7FF will reset flip-flop 128 via an active low on line 124b. Then from the truth table of FIG. 5, the inputs $C_2$ or $C_3$ of the multiplexer 84 will be selected by the outputs of the gates 112 and 114. Accordingly, if an uncoded instruction is being fetched from the RAMs 60, 62 or the ROMs 72, 74, it will be fed directly from memory via the multiplexer 84 to the microprocessor 32 for execution. Therefore, it can be seen that multiplexer 84 will be automatically controlled to select inputs $C_1$, $C_2$, $C_3$ or $C_4$ under control of the program being run.

The present invention constitutes a technique whereby the investment in software can be protected against unauthorized copying or use. More particularly, the hardware system 30 can be produced by a manufacturer and sold to a plurality of different users. Each user having one of the systems 30 can write his own user program to utilize the system 30 for a desired purpose. The user would write the program in higher level language or symbolic language as shown in FIG. 1A and then could assemble such program into machine language format shown in FIG. 1B using the published operation codes utilized by the microprocessor 32.

The higher level language of FIG. 1A or the machine language program of FIG. 1B may be stored on a disk which would then be sent to the manufacturer. The latter will then assemble the program into the encoded machine language format of FIG. 1C with the circuit 10 of FIG. 3 and return the encoded program to the user on disk. The manufacturer also will provide the system 30 with the ROM 86 having the decoding table which would be unique to the particular user, as would the table of ROM 24 used for encoding purposes. Consequently, any one having the user machine code of FIG. 1C would not be able to run the program properly on another system 30. If the program of FIG. 1C were run on such other system 30, the incorrect operation codes would be supplied by the multiplexer 84 to the microprocessor 32. This is because the ROM 86 of such other system would be decoding incorrectly, for example, the encoded operation code 30 at location 1E07. Therefore, since each system 30 supplied by the manufacturer will have a different table for the ROM 86, a user implemented program encoded for one system 30 can not be accurately run on another system 30. Of course, as already mentioned, the encoded program will not run properly on the user's system unless flip-flop 130 is set by an instruction operand.

Furthermore, the present invention also provides a technique whereby, for example, unauthorized access to a data file is prevented. This is accomplished by the manufacturer encoding the operation codes of the operating system differently for each system 30. Thus, for example, the executive routine put in by the manufacturer and stored in the ROMs 72 and 74 would be encoded differently than such a routine in other systems 30. Consequently, an unauthorized user attempting to change the operating system for his own benefit or utilize the operating system to gain access to a data file would need to know the encoding scheme of the operating system.

The encoding of the operation codes of the instructions has the advantage of making it relatively difficult to break the system to copy a program or access a data file without authorization. This is true for a number of reasons. First, the operation codes are encoded and decoded as a function of instruction location in the RAMs 60, 62 and ROMs 72, 74. For example, the code A5 is stored in location 1E08, whereby the encoded operation code is 87. This same operation code, if stored at location 1E17, would be encoded differently due to the predetermined contents of the ROMs 24 and 86 or 88. Secondly, the encoding and decoding of the operation codes is accomplished automatically as a function of the state of the system 30. That is, one encoding and decoding scheme is utilized when the system 30 is running the user implemented program while a different encoding and decoding scheme is used for the same system 30 when running the operating system.

Another advantage of the invention is that the decoding hardware can be retrofitted to existing computing systems by adding the ROMs 86 or 88 or both and the associated logic such as gates 100, 102 and 106 and decoder 124. Furthermore, a system 30 can be manufactured with the ROM 86 or 88 or both built inside the microprocessor 32 on a suitable chip. This means that these ROMs could not be disassembled from the microprocessor 32 in an attempt to crack the codes.

Furthermore, any authorization duplication of a system 30 including ROMs 86 and 88 or the encoded software will provide a unique coded pattern. In other words, the contents of the ROMs 86 or 88 or any copied encoded programs will identify the source of copied hardware and software. This will make it possible to enforce or police agreements concerning unauthorized copying.

It also will be noted that recording of the decoded instructions on line 108 or 110 will not recover any clear of the encoded program because of the looping and jumping of programs. That is, the program counter of the microprocessor 32 will not always increment to the next memory location. Instead, branches and jumps cause the program counter to be initialized with new values. Even if duplicate occurrences of instruction streams could be dealt with, it is not simple to force a program through all code sequences, even with the source listings available. Without these listings it is nearly impossible to stimulate, via input options, a program through all code sequences.

Still further, even with the full knowledge of the invention and the contents of the ROMs 86 and 88 matching an encoded program, recovery of the uncoded program is difficult to impossible. A computer program known as a disassembler would be used in an attempt at recovery. However, knowledge is needed of the initial memory location of the program for the disassembler to start recovery. However, if data follows a branch or jump, the disassembler will try to interpret this data as an instruction. The disassembler will then produce jibberish until by chance it resynchronizes on an instruction. Interleaved codes and data is the general practice with computers such as system 30.

Also, the disassembler would need to know which decoding state is in effect, such as the operating system decoding state. The decoding state, i.e., the state of flip-flops 128, 130, is sequence dependent, not location dependent. The ability of a disassembler to recover the program then becomes nearly impossible.

Other embodiments of the invention than already described are feasible. For example, the function of ROMs 86 and 88 can also be performed by high speed RAMs. This can be accomplished by having the operating system load in a program A which is encoded. The operating system then places the machine 30 in a coded mode and branches to the initial operation code of program A. Program A in turn then loads a decoder RAM with a new decoder table and then loads an encoded program B that can be decoded with the contents of the decoder RAM. Program A then enables the RAM decoder and branches to program B.

While there has been described the encoding of the operation codes of instructions, the operands of the instructions also can be encoded. In a system in which, for example, user created instructions are stored in a ROM, both the operation codes and operands of the instructions can be stored in an encoded format. This encoding can be accomplished as a function of instruction location and machine state in a manner already described. A system such as system 30 could then be used with decoders to decode the encoded operation codes and operands of the instructions. The hardware, such as microprocessor 32, for this system would have a signal not only identifying the fetching of the operation codes, but also the fetching of the operands. For example, the synchronization signal on line 46 can be made to go high each time an operation code or operand of an instruction is fetched from the ROM for decoding purposes in a similar manner as already described.

Another simplified embodiment would involve a single decoding ROM table look-up technique that is not dependent on memory location or machine state. For each system 30, a ROM, such as ROM 24 would have a unique encoding table for encoding each published operation code of an instruction wherever it is to be stored. Similarly, a single decoding ROM such as ROM 86 would have a table to decode these encoded operation codes.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method of preventing unauthorized use of a program on a programmable computing machine which operates in accordance with uncoded machine language operation codes, comprising:
   (a) encoding the uncoded operation codes of instructions of the program as a function of location of the instructions of the program in a memory and as a function of the state of the machine prior to using the program on the computing machine; and
   (b) adding to the computing machine a decoder to decode the encoded operation codes to perform the object of the program.

2. A method according to claim 1 wherein the step of encoding comprises encoding the uncoded operation codes of the instructions in a code that is unique to the machine.

3. A method of according to claim 2 wherein the step of adding comprises adding a decoder that decodes only the uniquely encoded operation codes.

4. A method according to claim 1 wherein the step of encoding comprises:
   (a) receiving the program having the instructions including the uncoded operation codes from a machine user; and
   (a) converting the uncoded operation codes of the instructions of the received program to machine language encoded operation codes.

5. A method according to claim 4 wherein the step of converting converts the uncoded operation codes to the encoded operation codes uniquely to each machine.

6. A method according to claim 1 wherein the step of encoding comprises:
   (a) creating a machine language operating system program, the system having instructions including the uncoded operation codes; and
   (b) converting the uncoded operation codes of the instructions of the operating system program to machine language encoded operation codes.

7. Apparatus for preventing unauthorized use of a program on a programmable computing machine which operates in accordance with uncoded machine language operation codes, comprising:
   (a) means for storing prior to execution a machine language program having instructions with encoded operation codes;
   (b) means for decoding the encoded operation codes of the instructions, including means for converting the encoded operation codes of the instructions to the uncoded operation codes as a function of location of the instructions in said storing means and as a function of the state of the machine; and
   (c) means for executing the instructions of the program in accordance with the decoded operation codes.

8. Apparatus according to claim 7 wherein said means for storing stores a machine user implemented program having instructions including the encoded operation codes, and said means for converting converts the encoded operation codes of the instructions of the machine user implemented program to the uncoded operation codes.

9. Apparatus according to claim 7 wherein said means for storing stores an operating system program having instructions including the encoded operation codes, and said means for converting converts the encoded operation codes of the instructions of the operating system program to the uncoded operation codes.

10. Apparatus for controlling usage of a programmable computing machine which operates in accordance with uncoded machine language operation codes, comprising:
   (a) means for storing a machine user created program and an operating system program, each program having instructions including uncoded and encoded operation codes;

(b) first means for decoding the encoded operation codes of the instructions of the user created program;

(c) second means for decoding the encoded operation codes of the instructions of the operating system program; and (d) means for executing the instructions of the user created program and the operation system program having the decoded and the uncoded operation codes.

11. Apparatus according to claim 10 wherein said means for executing includes means for selecting the decoded operation codes of the instructions of the user created program or the operating system program.

12. Apparatus according to claim 11 wherein said first means for decoding and said second means for decoding each comprises means for converting the encoded operation codes of the instructions to the uncoded operation codes as a function of location of the instructions in said storing means.

13. Apparatus according to claim 12 wherein said converting means of each of said first decoding means and said second decoding means comprises a read only memory having a table of converting codes.

14. A method of preventing unauthorized use of a program on a programmable computing machine, comprising:

(a) encoding the instructions of the program prior to using the program on the computing machine as a function of the state of the machine; and (b) adding to the computing machine a decoder to decode the instructions to perform the object of the program.

15. A method according to claim 14 wherein the step of encoding further comprises encoding the instructions as a function of the location of the instructions of the program in a memory.

16. A method of controlling usage of a programmable computing machine which operates in accordance with uncoded machine language operation codes, comprising:

(a) encoding the uncoded operation codes of instructions of a program to be used on the computing machine as a function of location of the instructions of the program in a memory and as a function of the state of the machine; and (b) adding to the computing machine a decoder to decode the encoded operation codes to perform the object of the program.

17. Apparatus for controlling usage of a programmable computing machine which operates in accordance with uncoded machine language operation codes, comprising:

(a) means for storing a machine language program having instructions with encoded operation codes;

(b) means for decoding the encoded operation codes of the instructions, including means for converting the encoded operation codes of the instructions to the uncoded operation codes as a function of the location of the instructions in said storing means and as a function of the state of the machine; and (c) means for executing the instructions of the program in accordance with the decoded operation codes.

18. A method of controlling usage of a programmable computing machine, comprising:

(a) encoding the instructions of a program to be used on the computing machine as a function of location of the instructions of the program in a memory and as a function of the state of the machine; and (b) adding to the machine a decoder to decode the instructions to perform the object of the program.

19. Apparatus for preventing unauthorized use of programs on a programmable computing machine which operates in accordance with uncoded machine language operation codes, the programs including a first program and a second program, the first program and the second program each being stored in a respective memory and having instructions with encoded operation codes and uncoded operation codes, comprising:

(a) first means for decoding the encoded operation codes of the first program to produce decoded operation codes;

(b) second means for decoding the encoded operation codes of the second program to produce decoded operation codes;

(c) means for selecting the uncoded operation codes of the first program and the second program or the decoded operation codes of the first program or the decoded operation codes of the second program; and (d) means for automatically controlling said selecting means to select the uncoded operation codes of the first program and the second program or the decoded operation codes of the first program or the decoded operation codes of the second program as a function of the state of the machine.

20. Apparatus according to claim 19 wherein said means for automatically controlling is responsive to operands of the instructions.

21. Apparatus according to claim 19 wherein said means for automatically controlling comprises:

(a) means for decoding operands of the instructions; and (b) flip-flop means for changing state in response to the decoded operands.

22. Apparatus according to claim 19 wherein said first means for decoding and said second means for decoding each comprises:

(a) means for storing predetermined data and for outputting the data in response to the encoded operation codes stored in the memory; and (b) exclusive-Or means for producing the decoded operation codes in response to the data and to addresses to locations in the memory at which the encoded operation codes are stored.

23. Apparatus for preventing unauthorized use of programs on a programmable computing machine which operates in accordance with uncoded machine language operation codes, the programs including a first machine user created program and a second operating system program, the first program and the second program each being stored in a respective memory and having instructions with encoded operation codes and uncoded operation codes, comprising:

(a) first means for decoding the encoded operation codes of the first program to produce decoded operation codes, including:

(i) first means for storing first predetermined data and for outputting the first data in response to the encoded codes of the first program stored in the memory; and (ii) first exclusive-Or means for producing the decoded operation codes of the first program in response to the first data and to addresses to locations in the memory at which the encoded operation codes of the first program are stored;

(b) second means for decoding the encoded operation codes of the second program to produce decoded operation codes, including
  (i) second means for storing second predetermined data and for outputting the second data in response to the encoded operation codes of the second program stored in the memory; and
  (ii) second exclusive-Or means for producing the decoded operation codes of the second program in response to the second data and to addresses to locations in the memory at which the encoded operation codes of the second program are stored;

(c) multiplexer means for selecting the uncoded operation codes of the first program and the second program or the decoded operation codes of the first program or the decoded operation codes of the second program; and (d) means for automatically controlling said multiplexer means to select the uncoded operation codes of the first program and the second program or the decoded operation codes of the first program or the decoded operation codes of the second program as a function of the state of the machine, including:
  (i) means for decoding operands of the instructions; and
  (ii) flip-flop means for changing state in response to the decoded operands.

* * * * *

UNITED STATES PATENT AND TRADEMARK OFFICE
CERTIFICATE OF CORRECTION

PATENT NO. : 4,246,638

DATED : January 20, 1981

INVENTOR(S) : William J. Thomas

It is certified that error appears in the above—identified patent and that said Letters Patent is hereby corrected as shown below:

Front page, cancel the old address of the Inventor "Winterbrook Dr., San Jose, Calif. 95129" and replace it by --23995 Schulties Road, Los Gatos, California 95030--.

Column 7, line 50, "after $AX_{10-12}$", it should read --$AX_{13}$--.

Column 14, line 18, delete "(a)" at the beginning of the line and replace it by --(b)--.

Signed and Sealed this

*Twenty-third* Day of *June 1981*

[SEAL]

Attest:

RENE D. TEGTMEYER

*Attesting Officer*  *Acting Commissioner of Patents and Trademarks*